United States Patent [19]
Malloy et al.

[11] Patent Number: 5,900,907
[45] Date of Patent: May 4, 1999

[54] INTEGRATED VIDEOCONFERENCING UNIT

[75] Inventors: Craig Malloy; Michael Kenoyer; Pat Vanderwilt, all of Austin, Tex.; Scott Wakefield, Andover, Mass.

[73] Assignee: Polycom, Inc., San Jose, Calif.

[21] Appl. No.: 08/953,276

[22] Filed: Oct. 17, 1997

[51] Int. Cl.[6] ........................................... H04N 7/14
[52] U.S. Cl. ........................... 348/15; 348/14; 379/93.21
[58] Field of Search ................................... 348/14, 15, 16, 348/17, 18, 373, 375, 836; 379/93.17, 93.21; 340/461; 361/681

[56] References Cited

U.S. PATENT DOCUMENTS

| | | | |
|---|---|---|---|
| 5,438,357 | 8/1995 | McNielley | 348/15 |
| 5,539,451 | 7/1996 | Carey et al. | 348/12 |
| 5,612,733 | 3/1997 | Flohr | 348/15 |
| 5,734,414 | 3/1998 | Nishimura et al. | 348/14 |
| 5,760,824 | 6/1998 | Hicks, III | 348/14 |
| 5,778,082 | 7/1998 | Chu et al. | 381/92 |

*Primary Examiner*—Curtis A. Kuntz
*Assistant Examiner*—Melur Ramakrishnaiah
*Attorney, Agent, or Firm*—Carr & Ferrell LLP

[57] ABSTRACT

A videoconferencing unit is provided which integrates several components of a videoconferencing system to facilitate system setup and operation. The videoconferencing unit comprises a generally planar base structure adapted to be removably supported on a top surface of a video display monitor, such as a television monitor. The base structure terminates forwardly in a lip member which engages a front surface of the video display monitor. A first set of microphones is located at the lower portions of the lip member, and a second set of microphones is located at the upper edge surface of a tower member extending upwardly from the rear portion of the base structure. The vertical offset between the two sets of microphones thus established enables differential signal analysis to locate sound sources. The lip member may also be provided with one or more transmitters for transmitting control signals to a cooperatively placed receiver on the video display monitor.

17 Claims, 5 Drawing Sheets

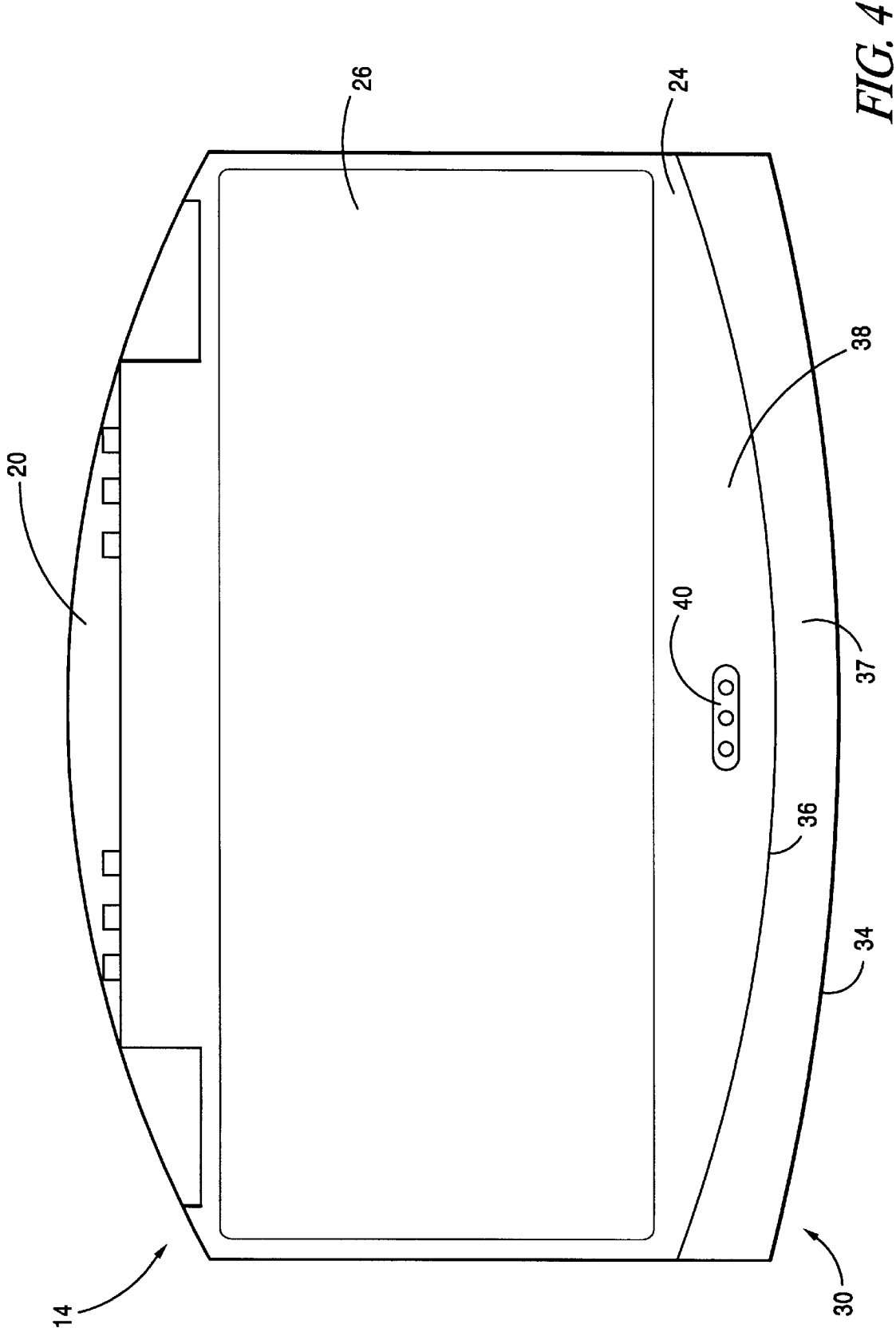

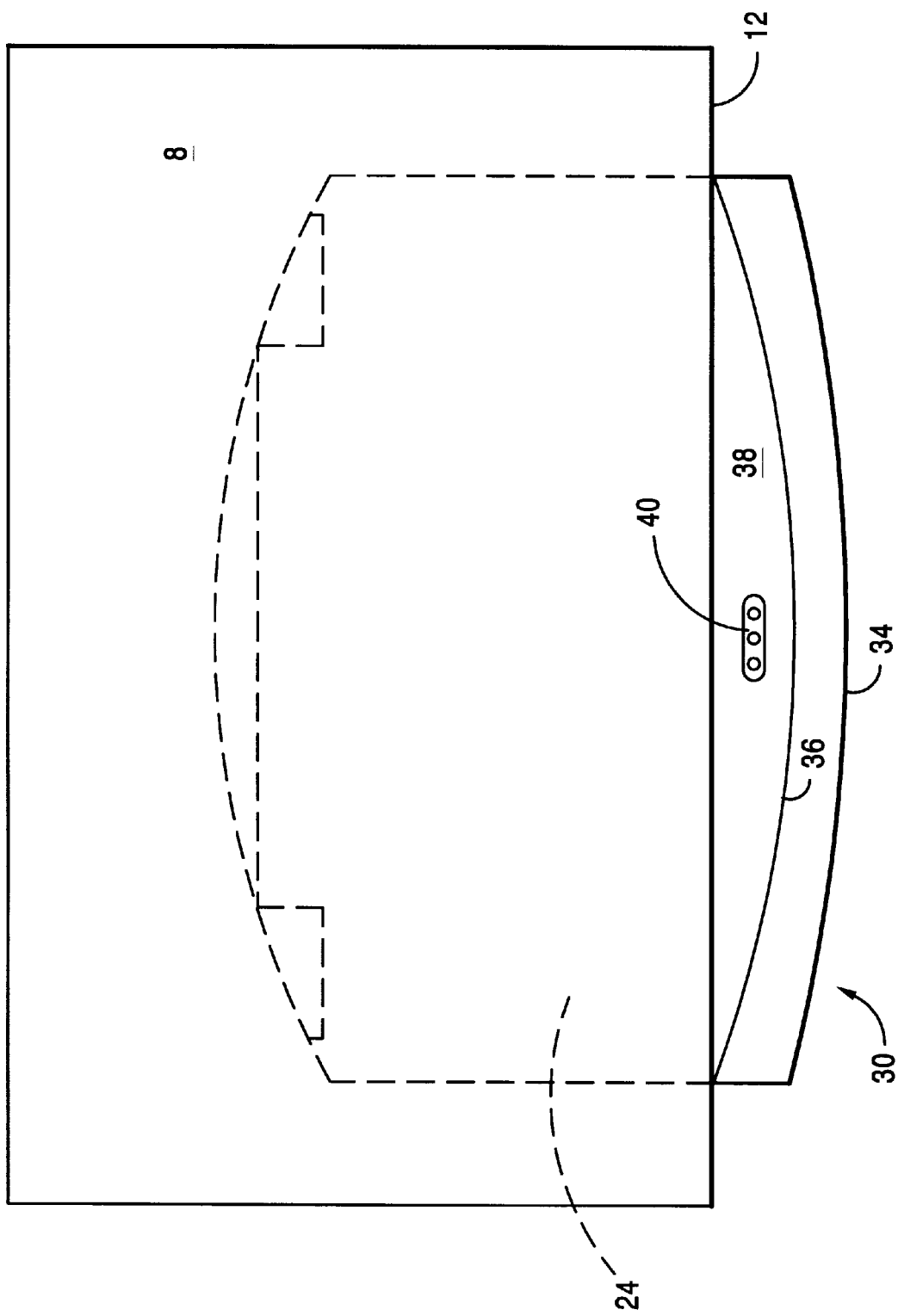

INTEGRATED VIDEOCONFERENCING UNIT

BACKGROUND OF THE INVENTION

1. Field of the Invention

The present invention relates to videoconferencing systems, and more particularly to an integrated videoconferencing control unit.

2. Background of the Art

Videoconferencing systems have become an increasingly important business communication tool. These systems facilitate meetings between persons or groups of persons situated remotely from each other, thus eliminating or substantially reducing the need for expensive and time-consuming business travel. Because the videoconference participants are able to see the facial expressions and gestures of the remote participants, richer and more natural communication is engendered. In addition, videoconferencing allows sharing of visual information, such as photographs, charts and figures, and may be integrated with personal computer applications to produce sophisticated multimedia presentations.

A problem associated with many commercially available videoconferencing systems is that they are difficult to set up and operate. A typical videoconferencing system may include a control unit to which are connected a variety of peripheral devices, such as a video camera, a video display monitor, one or more microphones, and one or more speakers. Improper connection of the peripheral devices to the control unit may render the videoconferencing system partially or wholly inoperative. Further, the peripheral devices, in particular the camera and microphone(s), must be carefully positioned to ensure that all persons involved in the videoconference are within camera and microphone range and thus may be seen and heard by the remote participants. Unless the participants have been thoroughly trained with respect to the operation of the videoconferencing system, frequent problems may arise.

In view of the foregoing, there is a need for a videoconferencing system which includes features which simplify system setup and operation.

SUMMARY OF THE INVENTION

The present invention provides a videoconferencing unit which integrates several components of a videoconferencing system and which is thereby intended to facilitate setup and operation. The videoconferencing unit includes a generally planar base structure which supports and partially houses a conventional video camera. The unit is preferably adapted to rest on the top surface of a video display monitor, such as a conventional television monitor. In accordance with this aspect of the invention, the front portion of the videoconferencing unit terminates in a downwardly folded lip member designed to engage in overhanging relation the front surface of the video display monitor. Engagement of the lip member with the front surface of the monitor prevents undesirable backward movement of the videoconference unit which may be caused by pulling of cables or wires connected to ports located at the rear portion of the videoconferencing unit.

The lip member is provided with at least one transmitter, which may comprise for example an infrared light emitting diode, oriented to transmit control signals to be received by at least one receiver disposed on the video display monitor. The lip member is preferably formed to define a gap through which ambient air may flow in order to achieve convective cooling of adjacent surfaces of the videoconferencing unit. The gap may also function to prevent obstruction of the transmitter. A conductive buffer member, typically comprising a sheet of metallic material, is preferably provided on the lower surface of the videoconferencing unit to minimize interference occurring between the videoconferencing unit and the video display monitor.

In accordance with another aspect of the invention, the videoconferencing unit is further provided with an upstanding tower member disposed at the rear portion of the base structure. A first group of microphones is positioned along the upper edge surface of the tower member. A second group of microphones is positioned on the lip proximal to the lowermost portion thereof. By establishing a sufficient height difference between the first and second groups of microphones, differential signal analysis methods known in the art may be employed to locate or track the source of a sound (e.g., a videoconference participant). Such methods may be employed, for example, to adjust camera position so as to view and track a speaker. The positioning of the microphones on the downwardly folded lip permits a sufficient vertical offset to be established relative to the tower-positioned microphones without having to extend the tower vertically upwards by an excessive amount.

The base structure further houses electronic circuitry, of the type and description known in the art, which is coupled to the video camera and to the microphones to process the signals received therefrom and to communicate the processed signal to a remote videoconferencing unit. The base structure and tower may be adapted with venting grids to facilitate dissipation of heat to the environment and to thereby prevent overheating of the electronic circuitry.

BRIEF DESCRIPTION OF THE DRAWINGS

FIG. 4 is a bottom plan view of the videoconferencing unit, illustrating a transmitter, a buffer member, and a lip gap formed in the lip member;

FIG. 4A is a bottom perspective view of a video display monitor with the videoconferencing unit's lip protruding in an outwardly direction.

DETAILED DESCRIPTION OF THE PREFERRED EMBODIMENT

Figure 1:
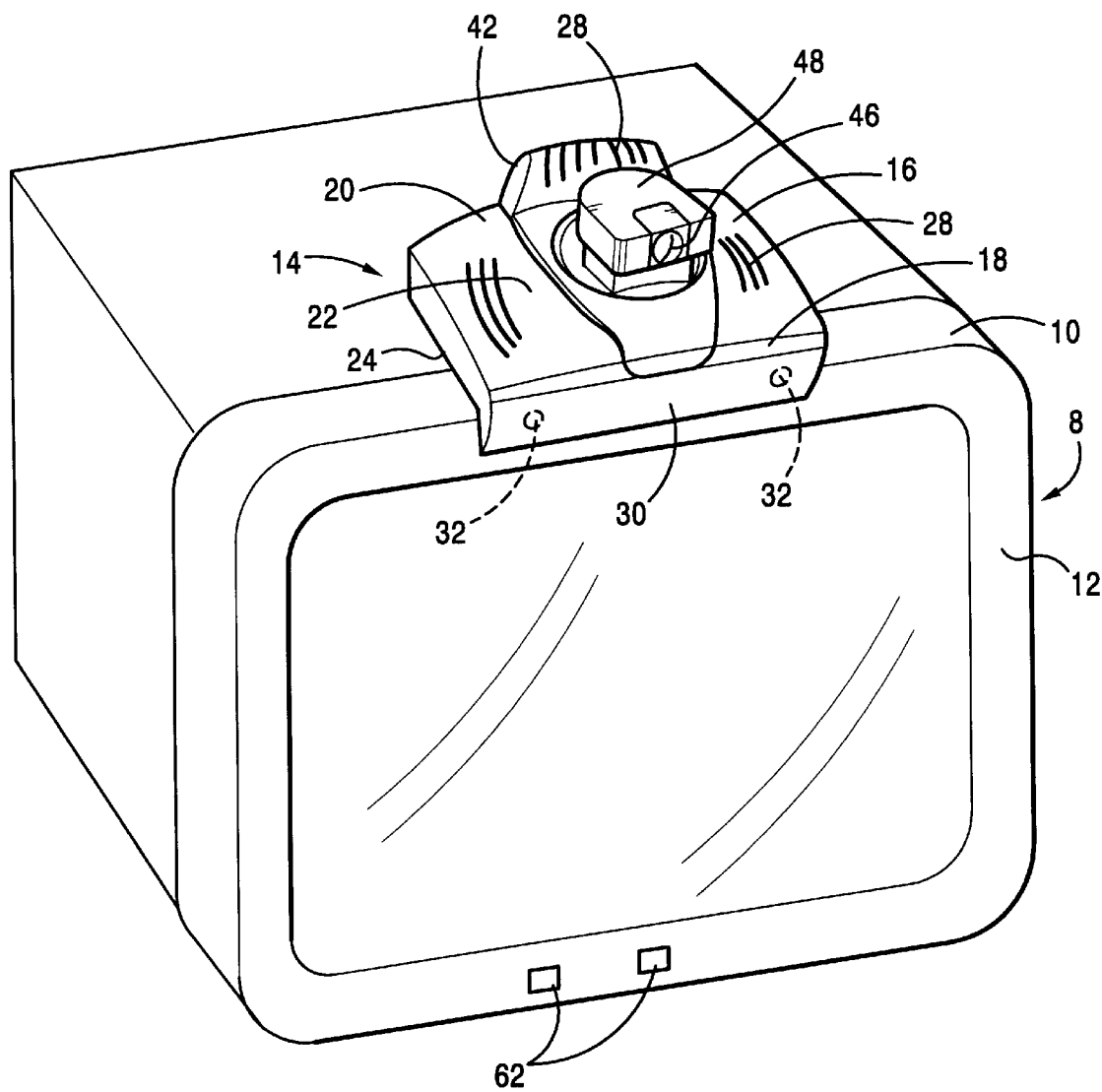
FIG. 1 is a perspective view of a videoconferencing unit, in accordance with the present invention, supported by a video display monitor.
Figure 2:
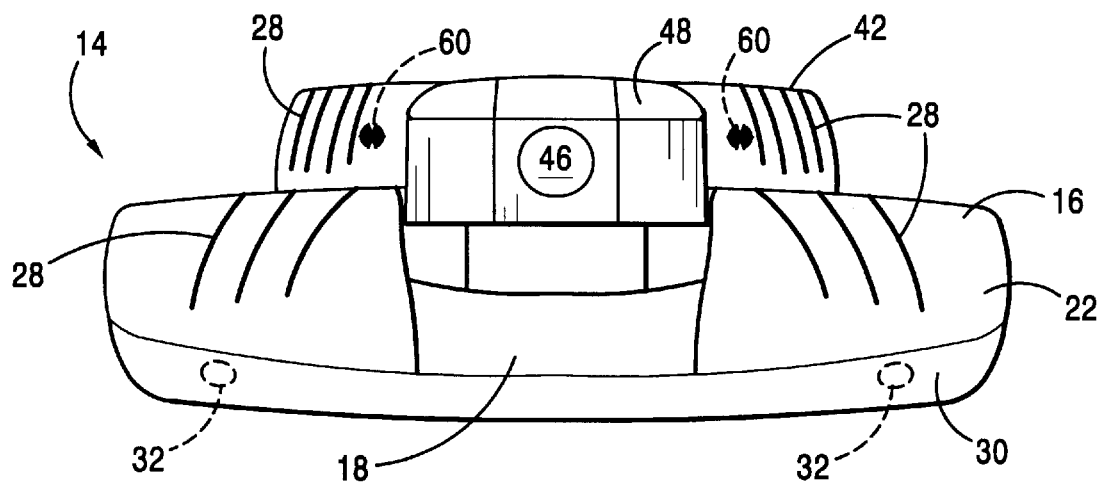
FIG. 2 is a front elevational view of the videoconferencing unit, which clearly shows a base structure, a lip member, a tower assembly, venting grids, and a video camera unit.
Figure 3:
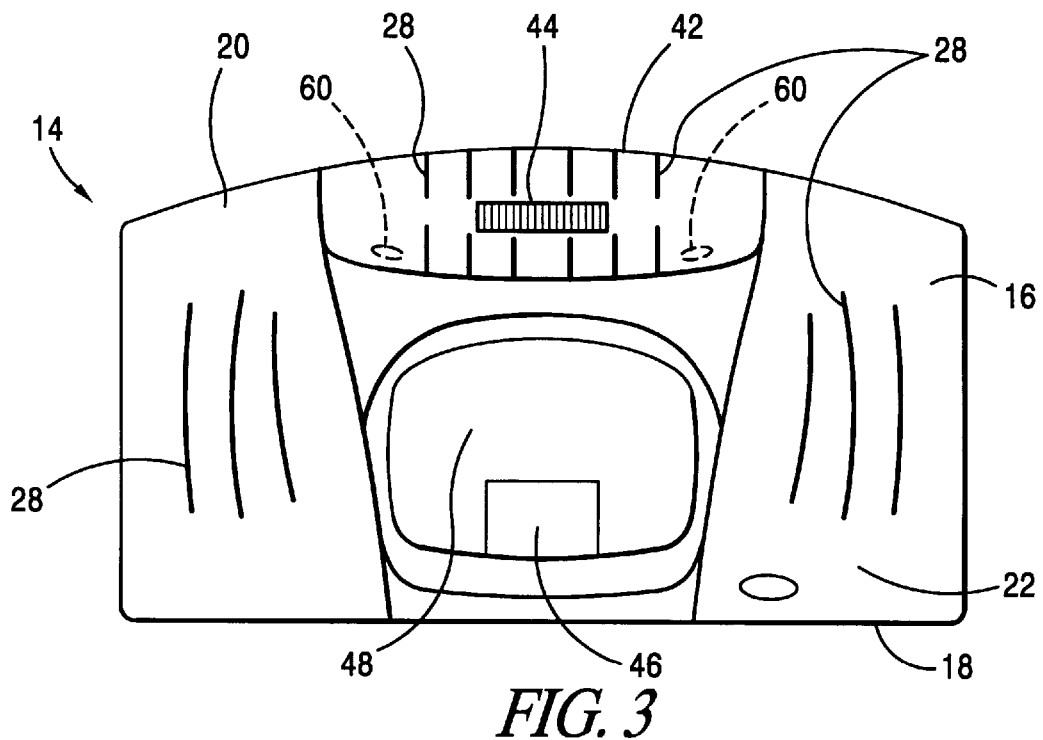
FIG. 3 is a top plan view of the videoconferencing unit.

Referring in detail now to the drawings wherein similar parts of the invention are identified by like reference numerals, and initially referring to FIGS. 1–5 for a preferred embodiment of the invention, there is seen a videoconferencing unit, generally illustrated as 14, removably supported on a video display monitor 8. As best shown in FIG. 1, the video display monitor 8 is a conventional monitor such as a television monitor or a computer monitor.

As illustrated in FIGS. 1–5, the videoconferencing unit 14 comprises a base structure 16 geometrically generally defined by a front portion 18, a rear portion 20, an upper surface 22, and a lower surface 24. The base structure 16 rests on a top surface 10 of the video display monitor 8 such that the lower surface 24 is positioned proximal the top surface 10. A buffer member 26 underlies the lower surface 24 to serve as a protective barrier against the video display monitor 8 (see FIG. 4). The primary function of buffer member 26 is to prevent electromagnetic interference caused by the video display monitor 8. The buffer member 26 is substantially coextensive with the base structure lower surface 24 and may be fabricated from a metallic or other suitable material. Venting grids 28 are dispersed throughout the upper surface to discharge the heat generated from the videoconferencing unit (see FIGS. 2 & 3).

The videoconferencing unit additionally comprises a lip member 30 formed integrally with or secured to the base structure 16. The lip member 30 extends forwardly and downwardly from the front portion 18. A first group of microphones 32, for the production of signals responsive to audio input, are set in the lip member 30 proximal the lowermost portion thereof. An inner wall 36 joined to an outer wall 34 structurally define the lip member 30 (see FIGS. 4 & 4A). The inner wall 36 is geometrically generally defined in an arch shape. When the videoconferencing unit 14 is placed on the video display monitor 8, the lip member 30 overhangs a portion of a front surface 12 of the video display monitor 8 (see FIG. 5). Because the inner wall 36 of the lip member 30 is curved in an inwardly direction, the thickness of the width of the lip member 30 decreases as it approaches the lip's middle portion 37, increasing in size as it expands outwards (see FIG. 4). As a result, when the lip member 30 compresses against the front surface 12 of the video display monitor 8, a gap 38 is formed in the lip member between the inner wall 36 of the lip 30 and the front surface 12 (see FIG. 4A). One or more transmitters 40, which may comprise for example infrared light emitting diodes, are disposed within the gap 38. The transmitters are configured to transmit control signals to signal receivers 62 located on the video display monitor in order to effect control by the videoconferencing unit of various functional parameters of the video display monitor. For example, the transmitters may transmit a volume adjustment signal responsive to a user request.

The gap 38 permits the flow of ambient air therethrough to promote convective cooling of adjacent surfaces, thereby preventing overheating of the videoconferencing unit. The gap 38 may further function to minimize physical obstruction of the transmitters which would interfere with the transmission of the control signal.

Figure 5:
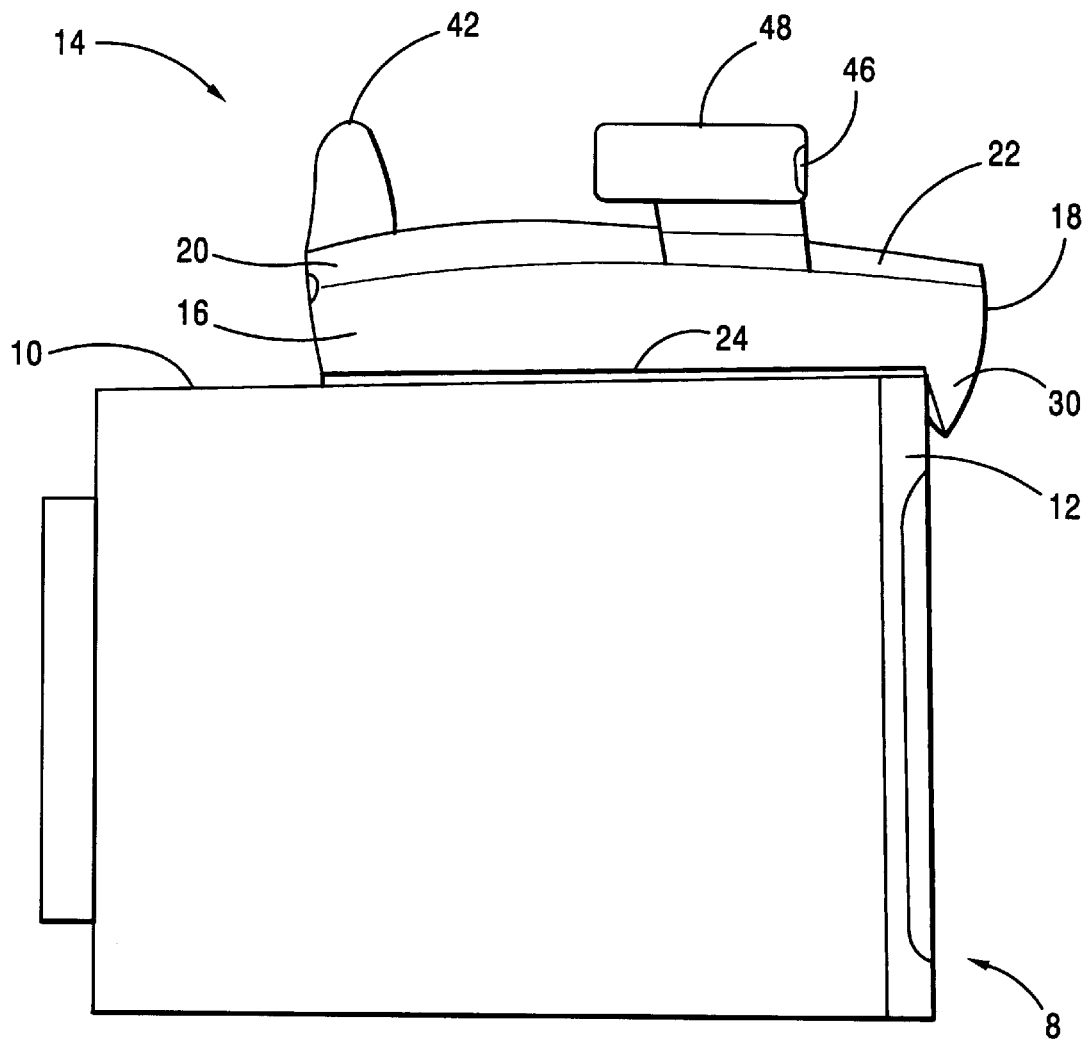
FIG. 5 is a side elevational view of the videoconferencing unit.

As may be seen with reference to FIG. 5, the lip member 30 engages in overhanging relation the upper front surface of the video display monitor 8. The lip member thus serves to maintain the position of the videoconferencing unit with respect to the video display monitor and prevent its rearward displacement if, for example, cables or wires attached to ports located at the rear of the videoconferencing unit are inadvertently tugged.

A tower member 42, formed integrally with or secured to the base structure 16, extends upwardly from the rear portion 20. The tower member 42 is adapted with venting grids 28 for facilitating the dissipation of heat generated by the operation of the videoconferencing unit 14. A second set of microphones 60 are preferably set in the tower assembly 42 proximal to the upper edge surface thereof (see FIG. 3). By providing a sufficient vertical offset between the first group of microphones 32 located on the lip and the second group of microphones 60 located on the tower, differential signal analysis may be employed to identify the location of audio sources (i.e., videoconference participants). This technique may be used, for example, to enable camera tracking of a moving speaker or to focus on the participant who is speaking at any given time. Such differential signal analysis algorithms, which generally involve comparing signals received from two or more spatially offset microphones, are known in the art and will not be discussed herein.

A video camera 46, of a type well known in the art, is housed within a pod unit 48, is connected to the upper surface 22. The pod unit 48 is capable of rotating both in the vertical and horizontal plane of motion to enable adjustment of the camera's field of view.

The base structure 16 further houses electronic circuitry, of a type and description known in the art. The electronic circuitry is coupled to the microphones 32, the transmitters 40, the pod 48, and the video camera 46 to process the signals received therefrom and to communicate the processed signals to a remote videoconferencing unit. The base structure 16 is preferably made of plastic or any other suitable polymer or material. The videoconferencing unit 14 of the present invention provides the desired communicating system without detracting from the overall aesthetics of the device.

The invention has now been explained with reference to a specific embodiment. Having described the invention in detail, those skilled in the art will appreciate that modifications may be made of the invention without departing from its spirit. Therefore, it is not intended that the scope of the invention be limited to the specific embodiments illustrated and described. Rather, it is intended that the appended claims and their equivalents determine the scope of this invention.

What is claimed is:

1. An integrated videoconferencing unit comprising:

a video camera for producing an electronic image;

a generally planar base structure for supporting and partially housing the video camera, the base structure having a top surface and a bottom surface and a front and rear portion;

a downwardly folded lip member disposed forwardly of the base structure, for engaging in overhanging relation a front surface of a video display monitor and for preventing rearward displacement of the videoconferencing unit;

an upstanding tower member extending upwardly from the rear portion of the base structure and terminating in an upper edge surface;

a first set of microphones disposed proximal the lowermost portion of the lip member;

a second set of microphones disposed proximal the tower member upper edge surface, wherein a vertical offset is established between the first and second set of microphones; and electronic circuitry housed in the base structure and coupled to the video camera and to the plurality of microphones, for processing signals received therefrom and for communicating the processed signals to remote locations.

2. The integrated videoconferencing unit of claim 1, further comprising at least one transmitter disposed in the lip member, for transmitting a control signal to a receiver located on the video display monitor.

3. The integrated videoconferencing unit of claim 2, wherein the at least one transmitter comprises an infrared light emitting diode.

4. The integrated videoconferencing unit of claim 1, further comprising a buffer member for preventing electromagnetic interference, the buffer member being located underneath the base structure lower surface and being substantially coextensive therewith.

5. The integrated videoconferencing unit of claim 1, wherein the vertical offset between the first and second set of microphones is selected to permit differential signal analysis.

6. The integrated videoconferencing unit of claim 1, wherein the base structure and tower include venting grids dispersed thereon to facilitate heat dissipation.

7. The integrated videoconferencing unit of claim 1, wherein the lip member is adapted with a gap to permit the flow of air therethrough.

8. A videoconferencing system comprising:

a video display monitor for presenting visual images, the video display monitor including a top surface and a front surface, the front surface having disposed thereon at least one receiver for receiving control signals;

a base structure adapted to be supported on the video display monitor top surface, the base structure having an upper and a lower surface and a contiguous front and rear portion, the front portion terminating in a downwardly directed lip member engaging the video display monitor and preventing the rearward displacement of the base structure;

a tower member extending upwardly from the base structure rear portion and terminating in an upper edge surface;

a video camera for producing an electronic image supported by and partially housed in the base structure;

a first set of microphones disposed proximal the lowermost portion of the lip member;

a second set of microphones disposed proximal the upper edge surface of the tower member, thereby establishing a vertical offset between the first and second set of microphones; and electronic circuitry housed within the base structure and coupled to the video camera and to the microphones, for processing signals received thereby and for communicating the processed signals to a remote location.

9. The videoconferencing system of claim 8, wherein the lip member has arranged thereon at least one transmitter for transmitting control signals to the at least one receiver.

10. The videoconferencing system of claim 9, wherein the at least one transmitter comprises an infrared light emitting diode, and the at least one receiver comprises a photodiode.

11. The videoconferencing system of claim 8, wherein the video display monitor comprises a conventional television monitor.

12. The videoconferencing system of claim 8, wherein the lip member is adapted with a gap to permit airflow therethrough.

13. The videoconferencing system of claim 8, further comprising a buffer member interposed between the base structure lower surface and the video display monitor upper surface.

14. The videoconferencing system of claim 8, wherein the base structure and tower are adapted with venting grids to facilitate heat dissipation.

15. The videoconferencing system of claim 8, wherein the vertical offset is selected to provide optimum differential signal analysis.

16. A method of operating a videoconferencing system, the method comprising the steps of:

providing a video display monitor having an upper surface and a front surface, the front surface having at least one receiver disposed thereon for receiving control signals;

providing a generally planar videoconferencing unit having a front and a rear portion and an upper and lower surface, the front portion terminating in a lip member;

providing at least one transmitter configured to transmit control signals, the at least one transmitter being disposed on the lower surface of the lip;

positioning the videoconferencing unit atop the video display monitor such that the lip overhangs the video display monitor; and transmitting control signals from the at least one transmitter to the at least one receiver in accordance with a desired control function.

17. The method of claim 16, wherein the step of transmitting the control signal is effected by emission of infrared light.

\* \* \* \* \*